United States Patent
Gluck et al.

(10) Patent No.: US 6,228,418 B1
(45) Date of Patent: May 8, 2001

(54) VEGETARIAN PET TREAT

(75) Inventors: Gilbert Gluck; Michael T. Yatcilla, both of Irvine; Bradford L. Kent, Sherman Oaks, all of CA (US)

(73) Assignee: Cyvex Nutrition, Irvine, CA (US)

( * ) Notice: Subject to any disclaimer, the term of this patent is extended or adjusted under 35 U.S.C. 154(b) by 0 days.

(21) Appl. No.: 09/287,609

(22) Filed: Apr. 7, 1999

(51) Int. Cl.⁷ .................................................. A23K 1/18
(52) U.S. Cl. .................. 426/623; 426/630; 426/635; 426/648; 426/650; 426/656; 426/658; 426/805
(58) Field of Search .................................... 426/623, 630, 426/635, 650, 656, 658, 648, 805

(56) References Cited

U.S. PATENT DOCUMENTS

| | | | |
|---|---|---|---|
| D. 354,613 | | 1/1995 | Kreger .................................. D1/124 |
| D. 380,072 | | 6/1997 | Correll .................................. D1/199 |
| 4,039,692 | * | 8/1977 | Clausen ................................ 426/532 |
| 4,229,485 | * | 10/1980 | Brown et al. ........................ 426/305 |
| 4,371,556 | | 2/1983 | Pitchon et al. ....................... 426/311 |
| 4,735,808 | * | 4/1988 | Scaglione et al. ..................... 426/62 |
| 4,735,943 | * | 4/1988 | Ban et al. ............................. 514/253 |
| 4,822,626 | * | 4/1989 | Spanier et al. ......................... 426/94 |
| 4,892,748 | | 1/1990 | Andersen et al. .................... 426/635 |
| 4,978,548 | | 12/1990 | Cope et al. ........................... 426/439 |
| 5,298,274 | | 3/1994 | Khalsa ................................. 426/560 |
| 5,569,458 | * | 10/1996 | Greenberg ......................... 424/195.1 |
| 5,869,121 | * | 2/1999 | Brescia et al. ....................... 426/281 |
| 5,888,514 | * | 3/1999 | Weisman ........................... 424/195.1 |
| 5,922,692 | * | 7/1999 | Marino .................................. 514/54 |
| 5,989,604 | * | 11/1999 | Wolf et al. ........................... 426/103 |
| 6,027,716 | * | 2/2000 | Levin et al. ........................... 424/58 |
| 6,117,477 | * | 9/2000 | Paluch .................................. 426/623 |
| 6,156,355 | * | 12/2000 | Shields, Jr. et al. ................... 426/74 |

FOREIGN PATENT DOCUMENTS 96 32113 * 4/1996 (WO) .

* cited by examiner

*Primary Examiner*—Chhaya D. Sayala
(74) *Attorney, Agent, or Firm*—Klein & Szekeres, LLP

(57) ABSTRACT

A treat for pets, primarily for dogs is made by first preparing a wet dough composition that includes approximately 25 to 50 percent by weight of corn flour; approximately 0.2 to 2.0 percent by weight of a palatability enhancer selected from the group consisting of vegetable digest, liver digest, poultry digest, beef digest; approximately 2 to 15 percent by weight of a protein, preferably selected from the group consisting of soy protein, whey protein and beef protein; approximately 0.1 to 5.0 percent by weight of a nutraceutical composition, and approximately 35 to 55 percent by weight of an aqueous solution that optionally includes a palatability enhancer where the palatability enhancer is present in the solution by approximately 1.0 to 5.0 percent by weight. The wet dough composition is baked and thereafter rebaked or fried. Prior to rebaking and or after frying the following further components may be added: 2 to 4 percent by weight of a palatability enhancing oil, 4 to 10 percent by weight of seasoning and one or more nutraceutical products. The pet treat product does not have any other ingredient of animal origin in substantial amount.

11 Claims, No Drawings

VEGETARIAN PET TREAT

BACKGROUND OF THE INVENTION

1. Field of the Invention

The present invention is in the field of pet treats. More particularly, the present invention is in the field of pet treats which are palatable to pets, particularly to dogs and are based exclusively or virtually exclusively on vegetarian products and contain nutraceutical ingredients.

2. Brief Description of the Prior Art

Food products for pets and particularly specialty food products known as pet treats are old in the art. In this connection pet treats for dogs and cats, and primarily treats for dogs are of interest as background art to the present invention. Pet treats ideally should be highly palatable for the animal (pet) and at the same time should be relatively low in calories to avoid obesity in pets. The prior art has attempted to avoid high caloric content in pet treats by providing treats with high cellulose and fiber content. Palatability has, generally speaking, been achieved in the prior art by the use of meat and meat by-products, which, generally speaking, contain high levels of fat. The use of meat and meat by-products in any event, is considered undesirable or objectionable by a significant segment of the human population. For this reason there is need in the state-of-the-art for a pet treat, and particularly for a treat designed primarily for consumption by canines, which is palatable and is based exclusively or virtually exclusively on plant-based (vegetarian) products.

The following specific patents are believed to be of interest as background to the present invention: U.S. Pat. No. 4,371,556 which describes a dog food that contains soy bean products; U.S. Pat. No. 4,892,748 which describes a low calorie pet treat that contains cellulose and a non-caloric gum binder and U.S. Pat. Nos. D0,354,613 and D0,380,072 which show decorative designs for pet treats. Moreover, U.S. Pat. Nos. 5,298,274 and 4,978,548 pertain to corn chip and tortilla chip making technology and also are of interest as background to the present invention.

SUMMARY OF THE INVENTION

It is an object of the present invention to provide a treat for pets, primarily for dogs, which is palatable.

It is another object of the present invention to provide a treat for pets, primarily for dogs, which consists essentially of vegeterian ingredients.

It is still another object of the present invention to provide a treat for pets, primarily for dogs, which comprises nutraceutical ingredients.

The foregoing and other objects and advantages are attained by a composition that is used as a treat for pets, primarily for dogs and which prior to processing by baking and rebaking or frying comprises the following ingredients:

approximately 25 to 50 percent by weight of corn flour;

approximately 0.2 to 2.0 percent by weight of a palatability enhancer selected from the group consisting of vegetable digest, liver digest, poultry digest, beef digest;

approximately 2 to 15 percent by weight of a protein, preferably selected from the group consisting of plant protein, milk protein and meat protein approximately 0.1 to 5.0 percent by weight of a nutraceutical composition, and approximately 35 to 55 percent by weight of an aqueous solution that optionally includes a palatability enhancer where the palatability enhancer is present in the solution by approximately 1.0 to 5.0 percent by weight, and where the product after baking, rebaking or frying further contains approximately 2 to 4 percent by weight of a palatability enhancing oil, and optionally approximately 4 to 10 percent by weight of seasoning and where the product does not have any other ingredient of animal origin in substantial amount.

The features of the present invention can be best understood together with further objects and advantages by reference to the following description.

DESCRIPTION OF THE PREFERRED EMBODIMENTS

The following specification sets forth the preferred embodiments of the present invention. The embodiments of the invention disclosed herein are the best modes contemplated by the inventors for carrying out their invention in a commercial environment, although it should be understood that various modifications can be accomplished within the parameters of the present invention.

General Embodiments

The present invention provides a food product for consumption by pets, especially for dogs, the primary purpose of which is to be used as a treat, that is to be used as a praise or reward to the pet. A guiding principle in formulating this food product is to provide a high level of palatability for pets, especially for dogs, and also to provide a product that is primarily of plant and not of animal origin. In other words the pet treat food product of the invention is either exclusively based on vegetarian ingredients, or even if it contains some ingredients of animal origin as palatability enhancing agents, or nutraceuticals these are present in small amounts only. For this reason the pet treat of the present invention is, or can be considered primarily a vegetarian product.

The technology pertaining to food products and food processing in general and pertaining to pet food products in particular is well developed, and those skilled in the art are well familiar with this technology. The technology pertaining to food processing or manufacturing equipment in general, and pertaining to the manufacturing or processing of pet food in particular, is also well developed, and those skilled in the art are familiar with this technology as well. For this reason, in the present description terms which are well known to those skilled in the art are not defined in detail, and are described only to the extent necessary to describe the present invention. Similarly, machinery used for the manufacturing or processing the novel pet treat of the invention, which per se is well known in the art, is described only to the extent necessary to describe the invention.

The novel pet treat of the invention is prepared by first preparing a "wet formula", "wet dough" or "wet composition", a principal ingredient of which is corn flour that is present in the wet composition in an approximate ratio of 25 to 50 percent by weight of the wet composition. Corn flour per se is well known in the food processing or manufacturing arts, and is made from corn kernels in large quantities for various purposes, primarily for tortilla, tortilla chip and corn chip manufacturing. The corn flour used for tortilla chip manufacturing is also suitable for use as a principal ingredient in the wet composition of the pet treat of the present invention. As is well known, corn flour, in the quantities normally used in the food industry, is made by grinding whole kernels and this commercial product is normally known in the trade as masa corn flour. Such dry masa corn flour is well suited for use in the pet treat of the present invention.

A preferred range of corn flour is approximately 41 to 47% by weight of the wet composition.

The corn flour is mixed with a solid (powdered or the like) palatability enhancer that is added in a quantity that it comprises approximately 0.2 to 2.0 percent by weight of the wet composition. Palatability enhancer compositions per se are well known in the art, they typically comprise vegetable digest, garlic powder, deactivated yeast, liver digest in solid form, poultry or beef digest. Smoke flavor, anise oil and salt may also be palatability enhancers. The liver digest may originate from beef, chicken, lamb or pork liver, or may be a mixture of these four liver products. The palatability enhancer can also be a mixture of the above-noted vegetable, liver or meat digests, garlic powder and yeast. Inasmuch as the pet treat of the present invention is a vegetarian or substantially vegetarian product, the use of a palatability enhancer that contains exclusively or primarily only vegetable digest is preferred. Nevertheless, because the total proportion of the palatability enhancer in the product is low (in the above-noted range of 0.2 to 2.0 percent by weight of the composition) the pet treat product of the invention preserves its primarily plant-based (vegetarian) character even when the palatability enhancer contains products of animal origin.

A preferred range of the palatability enhancer is approximately 0.8 to 1.2% by weight of the wet composition.

Another principal ingredient is a protein that is present in the wet composition or wet dough in the range of approximately 2 to 15% by weight of the composition. Examples of vegetable proteins which are used, either alone, or in combination are soy protein, whey protein and caseinate. Each of these protein products per se are known in the art and are commercially available. A preferred range of the protein is approximately 7 to 9% by weight of the wet composition.

Another ingredient of the pet treat of the present invention is a nutraceutical product, or mixture of nutraceutical products, that is added in a ratio of approximately 0.1 to 5.0 by weight to the wet composition. The term nutraceutical has recently been accepted in the art to describe a food supplement that has either clinically verified or at least credible anecdotal medicinal properties. Examples of nutraceutical products which are incorporated in the pet treat of the present invention are St. John's wort extract that contains at least approximately 0.3% hypericin, Ginkgo Biloba extract that contains at least approximately 24% (by weight) of ginkgo flavones and at least approximately 6% (by weight) of terpene lactones, green tea extract, grape seed extract, glucosamine sulfate hydrochloride or other nutritionally acceptable salt of glucosamine, shark cartilage powder, vincamine, vinpocetine, chondroitin sulfate, greenlipped mussel powder, barley sprout and echinacea extract. Any one of the above examples of nutraceutical products by itself or in combination with another nutraceutical product can be added to the wet composition of the pet treat of the invention.

As an alternative to adding the nutraceuticals to the composition at this stage of the manufacture, the nutraceuticals (typically solids) can also be added at a later stage of the process of manufacturing the product of the present invention, for example together with a seasoning, as described below. With respect to the proportion or range of nutraceutical ingredient or ingredients in the product of the present invention the following should be kept in mind. Nutraceuticals range in potency from being almost drug-like (e.g vincamine) and effective in doses measured in milligrams to being essentially food products with medicinal properties such as barley sprouts, that are consumed in gram quantities. Hence the range of nutraceuticals in the general sense is quite broad. Preferred ranges for praticularly important nutraceuticals in the final product are provided below.

The above-described ingredients are combined with an aqueous solution that optionally includes a palatability enhancer (or mixture of palatability enhancers) in such proportion that the aquous solution comprises approximately 35 to 55 percent of the total mass of the wet composition. The aqueous solution itself contains a total of approximately 1.0 to 5.0 percent by weight of one or more of palatability enhancers of the type described above. In this ingredient also, a totally or predominantly plant-based palatability enhancer, such as vegetable digest, is preferred. A vegetable oil, such as canola oil may also serve as a palatability enhancer in the aqueous solution. Instead of an aqueous solution of the palatability enhancer, water can also be used in a quantity of approximately 35 to 55 percent of the total mass of the resulting wet composition. However, in such case the amount of solid pallatability enhancer is preferably increased to fully or partially replace the palatability enhancer that is lacking from the aqueous solution.

A preferred range of the aqueous solution is approximately 41 to 45% by weight of the wet composition.

Optionally a coloring agent or agents and vitamins and minerals are also components of the wet composition or wet dough in accordance with the present invention. Coloring agents normally used in the food processing industry for coloring tortillas chips, corn chips or like products may be used in accordance with the present invention. Coloring agents per se are well known in the art, examples of coloring agents suitable for use in the present invention are caramel derived from dextrose or fructose, natural colors and artifical food colorings. The coloring agent is optionally added to the pet treat product of the present invention in a weight ratio of approximately 0.1 to 1.0 percent relative to the weight of the wet composition.

A preferred range of the coloring agent or mixture of agents is approximately 0.4 to 0.5% by weight of the wet composition.

Vitamins or minerals may be optionally added to the pet treat of the invention in a ratio of approximately 0.1 to 0.5 percent by weight of the wet composition. These components per se are well known in the art, and can be readily obtained from commercial sources. Preferred minerals and vitamins are choline chloride, zinc sulfate, D-L-alpha tocopherol acetate, selenium, niacin, vitamin B12, calcium panthothenate, vitamin A, ascorbic acid, iron sulfate, pyridoxine HCl, thiamine mononitrate, manganous oxide, copper sulfate, riboflavin, folic acid, ethylene diamine dihydroiodide, and D-biotin. The vitamins and minerals preferably comprise approximately 0.2 to 0.24% by weight of the wet composition.

Still another optional ingredient of the wet composition or wet dough is dextrose that is preferably present in the range of approximately 0.8 to 1.0% by weight. Dextrose provides or improves a pleasing brown color that is present in the product of the invention after it has been baked and/or baked and fried, as described below.

The above described ingredients are thoroughly admixed with one another and with the aqueous solution of the palatability enhancer in machinery of the type which is normally used for the manufacturing tortilla chips or corn chips. More specifically, the above described ingredients when combined with the aqueous solution are mixed and agitated, as in a chip making process, to provide a formulation having the consistency of an extrudable dough. The dough is extruded in machinery again well known for use in the chip making and related processes to be deposited in a sheeter and cut into desired shapes and sizes. The extruded product is usually approximately 1.4 to 2.4 mm thick, the other two dimensions are largely variable; usually the extruded and cut pieces have dimensions, other than thickness, of approximately 5 to 70 mm.

The extruded raw product that has been cut into the above-described shapes and sizes is thereafter baked in an oven of a temperature in the range of approximately 300 to 525° F. for approximately 10 to 120 seconds. The oven used for this purpose is of the type that is normally used in the food processing/manufacturing industry for baking corn chips, tortilla chips and like products. Those skilled in the art will recognize that the amount of time the product is baked is dependent on the temperature of the oven, the higher is the temperature of the oven within the above given range, the shorter is the time the product needs to be exposed to it to achieve the desired result. The product that is obtained after baking has a moisture content in the range of approximately 25 to 40 percent by weight. A preferred range of temperature for baking is approximately 400 to 450° F.

The intermediate baked product (once baked product) obtained in the above-described manner is thereafter either baked once more (rebaked) or is fried to provide the pet treat of the invention.

Thus, in accordance with one mode of practicing the invention a palatability enhancing oil, such as canola oil, cotton oil, soy oil, corn oil, peanut oil, sunflower oil, safflower oil, or lard or tallow fat is sprayed or otherwise applied to the intermediate bake product in a quantity that is approximately 2 to 4 percent by weight of the intermediate product. Preferably, and in order to maintain the pet treat as a vegetarian product, the palatability enhancing oil is selected from canola oil, cotton oil, soy oil, corn oil, peanut oil, sunflower oil or safflower oil. The intermediate baked product is then baked again in an oven of a temperature in the range of approximately 250 to 525° F. for approximately 2 to 20 minutes. Those skilled in the art will recognize again that the amount of time the product is baked is dependent on the temperature of the oven, the higher is the temperature of the oven within the above given range, the shorter is the time the product needs to be exposed to heat to achieve the desired level of being baked. A preferred range of temperature for the second step of baking is approximately 300 to 350° F.

After the second stage of baking the moisture content of the resulting product is reduced to approximately 0.1 to 2.5 percent by weight. The product is then allowed to cool, and is preferably seasoned with a seasoning that becomes approximately 4 to 10 percent of the product weight. The seasoning is a free flowing dry mixture of herbs, spices, sugars, garlic flavor, natural flavorings, colorants, palatability enhancer, salt, vegetable powders or extracts, and meat or meat by-products, the latter two again being preferably omitted to provide a vegeterian product. Examples of herbs that may be included in the seasoning are parsley, rosemary and thyme. The presently preferred quantity of seasoning applied to the product, when seasoning is applied, is in the range of approximately 7 to 9% by weight. In the event nutraceuticals have not been added to the product earlier, then the nutraceuticals which have been described above, can be added together with the seasining, or instead of seasoning, at this stage of the process of manufacturing.

After the seasoning has been added to the product the product is gathered and packaged in accordance with practice usual in the art.

In accordance with another mode of practicing the invention the intermediate baked product is fried in oil for approximately 2 to 8 minutes at an oil temperature of approximately 325 to 400° F. The oil used for frying is preferably a vegetable oil, such as canola oil, cotton oil, soy oil, corn oil, peanut oil, sunflower oil, safflower oil. Alternatively, lard or tallow can also be used for frying, but the latter two are not preferred. The actual time of frying depends on the temperature of the oil, the hotter the oil, the less time is needed for frying the product. As a result of the just-described step of frying the residual oil or fat content of the fried product is in the range of approximately 14 to 30 percent by weight of the product. The moisture content is in the range of 0.1 to 2.5 percent. Presently preferred range of temperature for the oil in the frying step is approximately 345 to 370° F.

The fried product is optionally treated with the mixture of seasonings and/or or nutraceuticals, as is described above for the baked product, to provide the pet treat of the invention.

Thus, the final pet treat product obtained by rebaking contains ingredients in the following ranges (percent by weight of the final product): corn flour 76–80%, soy protein isolate 11–14%, deactivated yeast 1.5–1.9% serving as a palatability enhancer, dextrose 1.8–2.2% serving as a browning agent; vitamins and minerals 0.2–0.6%, garlic powder 0.7–0.9%, salt 0.1–0.3%, smoke flavor 0.2–0.40%, and anise oil 0.03–0.07% the latter four serving as palatability enhancers, and approximately 0.1 to 5% nutraceuticals.

The final pet treat product obtained by frying contains ingredients in the following ranges (percent by weight of the final product): corn flour 50–60%, soy protein isolate 8–10%, deactivated yeast 1–1.5% serving as a palatability enhancer, dextrose 1.4–2.0%, vitamins and minerals 0.1–0.40%, garlic powder 0.5–0.7%, salt 0.1–0.2%, smoke flavor 0.2–0.3%, anise oil 0.03–0.07% the latter 4 serving as palatability enhancer, soy and/or vegetable oil 15–30% which is absorbed by the product as a result of being fried in oil, and approximately 0.1 to 4.5% nutraceuticals.

With respect to the range or proportion of nutraceuticals in the final product the explanation provided above is applicable. Because nutraceuticals range widely in potency the proportion or range in the product of the invention depends on the specific nutraceutical product that is used. It should be understood that more than one nutraceutical product may be present in the pet treat of the present invention. The following specifics serve as examples:

when the nutraceutical is St. John's wort extract (0.3% hypericin), the preferred range of nutraceutical in the finished treat is 0.8to 1.2%;

when the nutraceutical is ginkgo biloba extract (24% ginkgoflavones, 6% terpene lactones), the preferred range of nutraceutical in the finished treat is 0.2 to 0.3%;

when the nutraceutical is green tea extract, the preferred range of nutraceutical in the finished treat is 0.2 to 0.3%;

when the nutraceutical is grape seed extract, the preferred range of nutraceutical in the finished treat is 0.2 to 0.3%;

when the nutraceutical is glucosamine sulfate hydrochloride, the preferred range of nutraceutical in the finished treat is 2.5 to 3.5%;

when the nutraceutical is shark cartilage powder, the preferred range of nutraceutical in the finished treat is 3.5 to 4.5%;

when the nutraceutical is vincamine, the preferred range of nutraceutical in the finished treat is 0.2 to 0.3%;

when the nutraceutical is vinpocetine, the preferred range of nutraceutical in the finished treat is 0.06 to 0.1%;

when the nutraceutical is chondroitin sulfate, the preferred range of nutraceutical in the finished treat is 1 to 2%;

when the nutraceutical is green lipped mussel powder, the preferred range of nutraceutical in the finished treat is 2.5 to 3.5%;

when the nutraceutical is barley sprout, the preferred range of nutraceutical in the finished treat is 4 to 5%, when the nutraeutical is echinacea extract, the preferred range of the nutraceutical in the finished product is 0.2 to 0.3%.

The following further examples describe specific modes and preferred embodiments of the invention.

SPECIFIC EXAMPLES

Baked Treat:

A batch of baked treat is prepared from the following ingredients in the following manner:

Dry Ingredients: 150 lbs. of corn flour; 24 lbs. of soy protein isolate; 3.2 lbs. of vegetarian chicken liver flavored seasoning powder; 8.3 lbs. of deactivated yeast; 3.7 lbs. of dextrose, 1.5 lbs. of garlic powder, 0.7 lbs. of vitamin/mineral blend; 0.5 lbs. of salt; 6 lbs. of glucosamine HCl, and 0.1 lbs. anise oil.

Wet Ingredients., 135 lbs. of water; 2 lbs. of vegetarian chicken liver flavored seasoning powder; 10 lbs. of canola oil.

Method: Combine all dry ingredients in vertical mixer. Blend on low speed (30 rpm) for 5 minutes. Add wet ingredients while mixing. Once all wet ingredients have been added, continue mixing for 5 minutes at 30 rpm. Remove resulting masa "dough" to extruder and feed dough the to sheeter and through dye cutter to form chips. Bake at 425 F. in conveyor oven 3½ to 5 minutes or until moisture content retained is 1½%. Remove resulting product from oven. Continue cooling the product and weigh. Final product weight is approximately 1.0 gram per chip. Yield from the batch is approximately 100,000 chips (220 lbs.) 2.

Fried Treat

A batch of fried treat is prepared from the following ingredients in the following manner:

Dry Ingredients: 150 lbs. of corn flour; 24 lbs. of soy protein isolate; 3.2 lbs. of vegetarian chicken liver flavored seasoning powder; 8.3 lbs. of deactivated yeast; 3.7 lbs. of dextrose; 1.5 lbs. of garlic powder; 0.7 lbs. of vitamin/mineral blend; 0.5 lbs. of salt; 6 lbs. of glucosamine HCl; and 0.1 lbs. of anise oil.

Wet Ingredients: 136 lbs. of water; 2 lbs. of vegetarian chickken liver flavored seasoning powder.

Method: Combine all dry ingredients in vertical mixer. Blend on low speed (30 rpm) for 5 minutes. Add wet ingredients while mixing. Once all wet ingredients have been added, continue mixing for 5 minutes at 30 rpm. Remove masa dough to extruder and feed the dough to sheeter and through dye cutter to form chips. Bake at 425 F. in conveyor oven for 1½ to 2 minutes or until moisture content retained is approximately 33%. Cool the cooked dough on a conveyor. Deep fry for 2½ minutes in 375 degree F. vegetable oil or until retained moisture content is approximately 1½%. Remove chips from oil. Continue cooling the chips and weigh. Final chip weight is approximately 1.2 grams. Yield from batch is approximately 100,000 chips (264 lbs.)

Seasoned Fried Treat

A batch of seasoned fried treat is prepared from the following ingredients in the following manner:

Dry ingredients: 150 lbs of corn flour; 24 lbs. of soy protein isolate; 3.2 lbs. of vegetarian chicken liver flavored seasoning powder; 8.3 lbs. deactivated yeast; 3.7 lbs. of dextrose, 1.5 lbs. of garlic powder; 0.7 lbs. vitamin/mineral blend; 0.5 lbs. of salt, and 0.1 lbs. of anise oil.

Wet Ingredients: 136 lbs. of water; 2 lbs. of vegetarian chicken liver flavored seasoning powder.

Seasoning Mix: 20 lbs. of ground rosemary; 40 lbs. of garlic powder; 40 lbs. of salt; 120 lbs. of smoked vegetarian bacon flavor; 20 lbs. of vincamine.

Method: Combine all dry ingredients in a vertical mixer. Blend on low speed (30 rpm) for 5 minutes. Add wet ingredients while mixing. Once all wet ingredients have been added, continue mixing for 5 minutes at 30 rpm. Remove masa "dough" to extruder and feed the dough to sheeter and through dye cutter to form chips. Bake at 425 F. in conveyor oven for 1½ to 2 minutes or until moisture content retained is approximately 33%. Cool the cooked dough on a conveyor. Deep fry for 2½ minutes in 375 degree F. vegetable oil or until retained moisture content is approximately 1½%. Remove chips from oil and sprinkle with seasoning mix. Recover seasoning mix that does not adhere to the chips. Continue cooling the chips and weigh. Final chip weight is approximately 1.2 grams. Approximate retention of seasoning is 12 mg per chip. Each chip is coated with approximately 1 mg of vincamine. Approximate recovery of seasoning is 80%. Yield from batch is approximately 100,000 chips (264 lbs.).

What is claimed is:

1. A method of making a baked pet treat consisting substantially of ingredients of vegetarian origin, comprising the steps of:

combining corn flour, protein, a palatability enhancer, and a nutraceutical ingredient selected from the group consisting of St John's Wort, vincamine, vinpocetine, green-lipped mussel powder, barley sprout and echinacea powder, said nutraceutical ingredient being in amounts 0.1 to 5% by weight of the pet treat;

mixing dry ingredients together until blended and then adding the wet ingredients while mixing to form a wet dough;

forming individual pet treat size pieces from said wet dough;

baking said wet dough to obtain a once baked product, and thereafter, treating said once baked product with heat for a second time, said step of treating with heat being selected from rebaking or frying in an edible oil to obtain the treat.

2. The method in accordance with claim 1 wherein the nutraceutical ingredient is added in the step of preparing the wet dough.

3. The method in accordance with claim 1 wherein the nutraceutical ingredient is added after the step of frying.

4. The method in accordance with claim 1 further comprising dextrose.

5. The method in accordance with claim 4 wherein the palatability enhancer comprises deactivated yeast.

6. The method in accordance with claim 1 where the nutraceutical is St. John's Wort extract having approximately 0.3% hypericin, and the nutraceutical is present in the range of 0.8 to 1.2% by weight.

7. The method in accordance with claim 1 where the nutraceutical is vincamine and the nutraceutical is present in the range of approximately 0.2 to 0.3% by weight.

8. The method in accordance with claim 1 where the nutraceutical is vinpocetine and the nutraceutical is present in the range of approximately 0.06 to 0.1% by weight.

9. The method in accordance with claim 1 where the nutraceutical is green lipped mussel powder and the nutraceutical is present in the range of approximately 2.5 to 3.5% by weight.

10. The method in accordance with claim 1 where the nutraceutical is barley sprout and the nutraceutical is present in the range of approximately 4 to 5% by weight.

11. The method in accordance with claim 1 where the nutraceutical is echinacea extract and the nutraccutical is present in the range of approximately 0.2 to 0.3% by weight.

\* \* \* \* \*

UNITED STATES PATENT AND TRADEMARK OFFICE
CERTIFICATE OF CORRECTION

PATENT NO. : 6,228,418 B1
DATED : May 8, 2001
INVENTOR(S) : Gluck et al.

It is certified that error appears in the above-identified patent and that said Letters Patent is hereby corrected as shown below:

Column 2,
Line 31, delete the "," after "agents".
Line 31, "nutraceuticals these" should be -- nutraceuticals, these --.

Column 5,
Line 7, "F." should be -- F --.
Line 34, "F." should be -- F --.

Column 6,
Line 45, add a space between "0.08" and "to".

Column 7,
Line 26, "F." should be -- F --.
Line 48, "F." should be -- F --.

Column 8,
Line 7, "F." should be -- F --.
Line 10, "F." should be -- F --.
Line 64, "nutraccutical" should be -- nutraceutical --.

Signed and Sealed this

Nineteenth Day of March, 2002

Attest:

JAMES E. ROGAN
Attesting Officer
Director of the United States Patent and Trademark Office